(12) United States Patent
Issler et al.

(10) Patent No.: US 9,279,499 B2
(45) Date of Patent: Mar. 8, 2016

(54) PISTON RING FOR AN INTERNAL COMBUSTION ENGINE

(71) Applicant: MAHLE International GmbH, Stuttgart (DE)

(72) Inventors: Wolfgang Issler, Schwaikheim (DE); Daniel Lopez, Stuttgart (DE); Jose Valentim Lima Sarabanda, Morumbi (BR)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 14/377,311

(22) PCT Filed: Feb. 8, 2013

(86) PCT No.: PCT/DE2013/000068
§ 371 (c)(1),
(2) Date: Aug. 7, 2014

(87) PCT Pub. No.: WO2013/117183
PCT Pub. Date: Aug. 15, 2013

(65) Prior Publication Data
US 2015/0040853 A1    Feb. 12, 2015

(30) Foreign Application Priority Data
Feb. 8, 2012   (DE) .......................... 10 2012 002 443

(51) Int. Cl.
*F02F 3/00*    (2006.01)
*F16J 9/12*    (2006.01)
(Continued)

(52) U.S. Cl.
CPC .... *F16J 9/12* (2013.01); *F16J 9/14* (2013.01); *F02B 3/06* (2013.01); *F02F 3/00* (2013.01); *F02F 3/22* (2013.01); *F05C 2201/021* (2013.01); *F05C 2201/0448* (2013.01)

(58) Field of Classification Search
CPC .................. F05C 2201/021; F05C 2201/0448; F02F 3/22; F02F 3/00; F02B 3/06
USPC ........................................................ 123/193.6
See application file for complete search history.

(56) References Cited

U.S. PATENT DOCUMENTS

| | | | |
|---|---|---|---|
| 1,282,347 A | 10/1918 | Wilson | |
| 1,999,233 A | * 4/1935 | Fall | .......................... F16J 9/063 123/193.6 |

(Continued)

FOREIGN PATENT DOCUMENTS

| | | |
|---|---|---|
| AT | 505 549 A4 | 2/2009 |
| DE | 18 00 264 C | 3/1974 |

(Continued)

OTHER PUBLICATIONS

International Search Report of PCT/DE2013/000068, mailed Jul. 29, 2013.
German Search Report in 10 2012 002 443.6, dated Jan. 25, 2013, with English translation of relevant parts.

*Primary Examiner* — Lindsay Low
*Assistant Examiner* — Charles Brauch
(74) *Attorney, Agent, or Firm* — Collard & Roe, P.C.

(57) ABSTRACT

The invention relates to a piston ring (10, 110, 210, 310, 410, 510, 610) for pistons of internal combustion engines, having a ring running surface (14), a ring back (11), an upper ring flank (12), a lower ring flank (13), and two ring joint ends spaced apart by a gap (15). According to the invention, at least one opening (17, 121, 217, 223, 325, 407) is provided in the ring running surface (14), which opening forms a fluid connection between the ring running surface (14) and the ring back (11) or a ring flank (12, 13).

9 Claims, 3 Drawing Sheets

Figure 1:
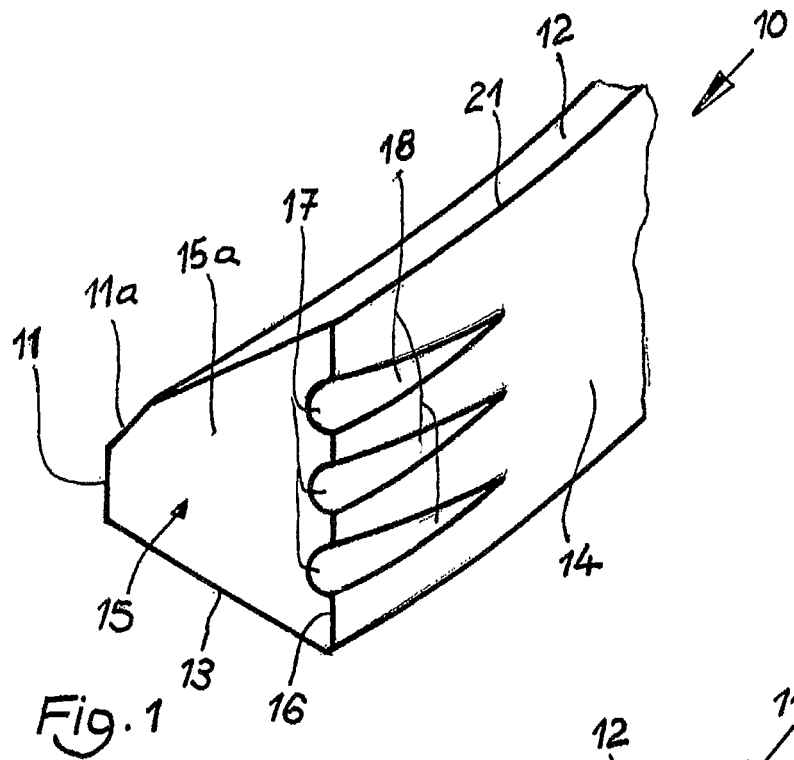

(51) Int. Cl.
*F16J 9/14* (2006.01)
*F02B 3/06* (2006.01)
*F02F 3/22* (2006.01)

(56) References Cited

U.S. PATENT DOCUMENTS

| | | |
|---|---|---|
| 4,128,250 A | 12/1978 | Barth |
| 8,177,237 B2 | 5/2012 | Lindner-Silwester et al. |
| 2007/0000468 A1* | 1/2007 | Azevedo ............... F02F 3/0084 123/193.4 |
| 2013/0147124 A1 | 6/2013 | Yang |

FOREIGN PATENT DOCUMENTS

| | | |
|---|---|---|
| DE | 40 25 868 A1 | 2/1992 |
| DE | 100 11 917 A1 | 9/2001 |
| DE | 10 2007 057959 A1 | 6/2009 |
| DE | 10 2010 020 490 A1 | 11/2011 |
| DE | 10 2010 020 764 A1 | 11/2011 |
| DE | 10 2012 002 447 A1 | 11/2012 |
| GB | 1 246 105 A | 9/1971 |
| GB | 2 151 721 A | 7/1985 |
| WO | 20091033115 A2 | 3/2009 |
| WO | 2012/022012 A1 | 2/2012 |

* cited by examiner

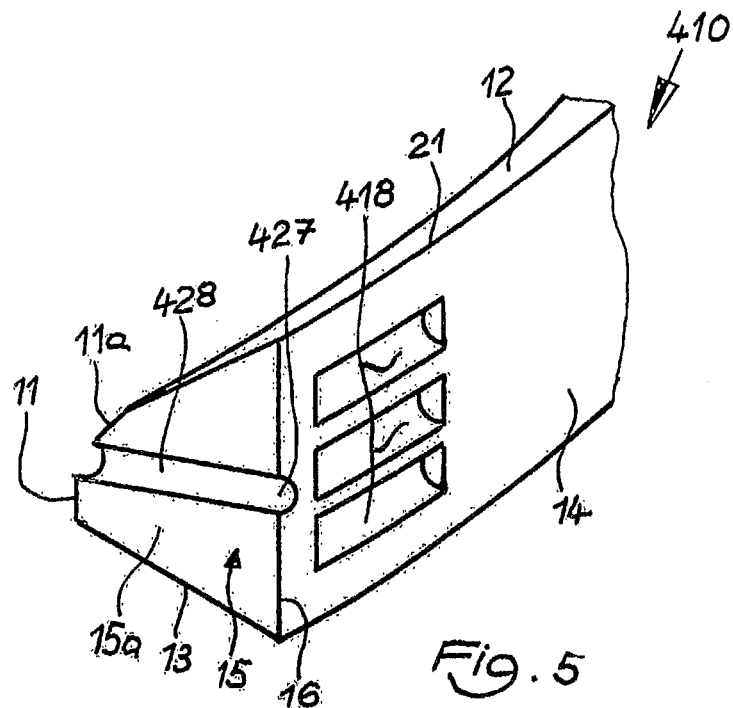
Fig. 5
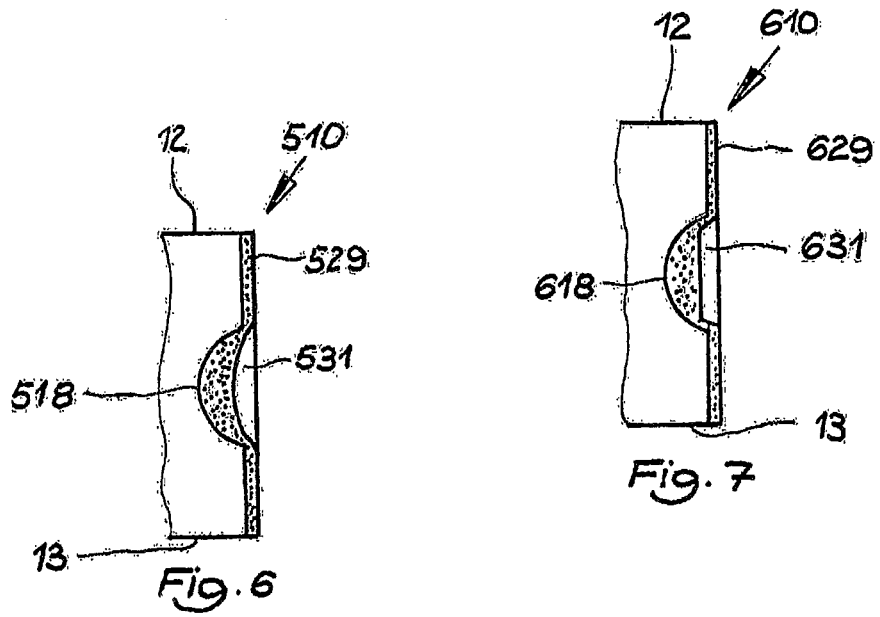
Fig. 6
Fig. 7

PISTON RING FOR AN INTERNAL COMBUSTION ENGINE

CROSS REFERENCE TO RELATED APPLICATIONS

This application is the National Stage of PCT/DE2013/000068 filed on Feb. 8, 2013, which claims priority under 35 U.S.C. §119 of German Application No. 10 2012 002 443.6 filed on Feb. 8, 2012, the disclosures of which are incorporated by reference. The international application under PCT article 21(2) was not published in English.

The present invention relates to a piston ring for pistons of internal combustion engines, having a ring face, a ring back, an upper ring side, a lower ring side, and two ring joint ends spaced apart by means of a gap.

The ring face of a coated piston ring is subjected to increased wear during engine operation, particularly in the region of its ring joint ends. The cause for this is the reinforced contact of the ring joint ends with the cylinder wall. A known measure to counter this wear consists in increasing the thickness of the coating, at least in the region of the ring joint ends, but this leads to increased production and material costs.

The task of the present invention consists in further developing a piston ring of the stated type, in such a manner that the useful lifetime, in terms of wear, in the region of the ring joint ends is increased in the simplest possible manner.

The solution consists in that at least one opening is provided in the ring face, which opening forms a fluid connection between the ring face and the ring back or a ring side.

In the installed state, the piston ring according to the invention is accommodated in the ring groove of a piston, in known manner. According to the invention, it is therefore provided that in the installed state of a piston in the cylinder of an internal combustion engine, a fluid connection is produced between the cylinder volume and the ring groove. Therefore pressure equalization can be produced on the basis of the entry of combustion gases during engine operation, which equalization brings about the result that the press-down force that acts radially outward is compensated in the region of the ring joint ends, and thereby the wear is reduced. Complicated application and finishing of an additional coating is therefore not necessary. The piston ring according to the invention brings about the result, different from the state of the art, that the useful lifetime of the piston ring, in terms of wear, is improved in the region of the ring joint ends, independent of the configuration of the coating of the ring face. Therefore the coating can be structured in any desired manner, and the piston ring according to the invention can be better adapted to the operating conditions that prevail in different engine types. Advantageous further developments are evident from the dependent claims.

The opening provided according to the invention can be configured in different ways.

Preferably, the at least one opening is configured as a fillet that runs radially along at least one face surface of a ring joint end from the ring face to the ring back. In this form, the opening provided according to the invention can be produced in particularly simple manner.

A further preferred embodiment consists in that the at least one opening is configured as a bore that runs from the region of the ring back or a ring side to the ring face. In this manner, the opening provided according to the invention can be provided at any desired location in the circumference region of the piston ring according to the invention, as a function of the conditions that prevail during engine operation.

A particularly preferred further development provides that at least one groove that runs in the circumference direction is introduced into the ring face. This groove has the particular further advantage that the combustion gases that act on the ring face penetrate into the groove during the combustion cycle, and, by means of the pressure that acts radially inward at the ring face penetrate into the groove during this movement phase, contribute to reducing the press-down pressure of the piston ring against the cylinder face, which acts radially outward, in the region of the ring joint ends. In this way, the wear stress on the piston ring according to the invention is further reduced.

A side effect of these preferred measures consists in that lubricant oil can enter into the groove during the ring movement in engine operation, so that a further reduction in friction is achieved along the cylinder working surface.

Preferably, the at least one groove is equipped or connected with at least one opening that forms a fluid connection between the ring face and the ring back or a ring side. In this way, the two mechanisms described above for reducing the wear stress in the piston ring are combined in particularly advantageous manner.

As has already been described, the at least one opening can be configured in many different ways, for example by means of at least one groove that opens into the face surface and/or into a ring side of the piston ring, furthermore by means of at least one recess, which, proceeding from at least one groove, opens into one of the ring sides, furthermore by means of a fillet that runs radially along at least one face surface of a ring joint end from at least one groove to the ring back and/or furthermore as a bore that runs from the region of the ring back or one of the ring sides to at least one groove. Particularly if the at least one groove opens into a ring side, preferably the upper ring side of the piston ring according to the invention, the entry of the gas pressure, which acts to relieve stress, is supported in particularly effective manner.

A further preferred embodiment of the invention consists in that the at least one groove is partially filled with a coating agent. Particularly if the ring face is coated with a coating agent, particularly a slide layer, the at least one groove can also be coated. In this case, part of the coating agent might have to be removed again, because the surface of the coating agent present in the groove is set back relative to the surface of the coated ring face. In this way, it is ensured that during the combustion cycle, the combustion gases that act at the ring face penetrate into the groove and exert the desired pressure that acts radially inward on the piston ring according to the invention. Alternatively, the at least one groove can be introduced, before the coating is applied, in such a manner that the groove depth is greater than the thickness of the coating, and thereby a groove-like depression is present even after the coating is applied.

Instead, the at least one groove can be covered with a mask before the ring face is coated with the coating agent, so that the coating agent does not penetrate into the groove.

In general, the coating is applied in a thickness of 5 μm to 30 μm, preferably 20 μm, for example using a PVD method.

It is practical if the length of the groove amounts to two to ten times the axial height of the ring face, in order to reliably relieve stress on the regions of the ring face in the vicinity of the ring joint ends, which are subject to particular stress. For the same reason, the depth of the groove should amount to 10 μm to 30 μm and/or the width of the groove should amount to 10% to 60% of the axial height of the ring face.

Depending on the requirements in an individual case, the groove can have a constant depth over its entire length, but it can also have a constantly decreasing or increasing depth, proceeding from the ring joint end, over its entire length. In comparable manner, the groove can have a constant width over its entire length, or a constantly decreasing or increasing width, proceeding from the ring joint end.

Figure 2:
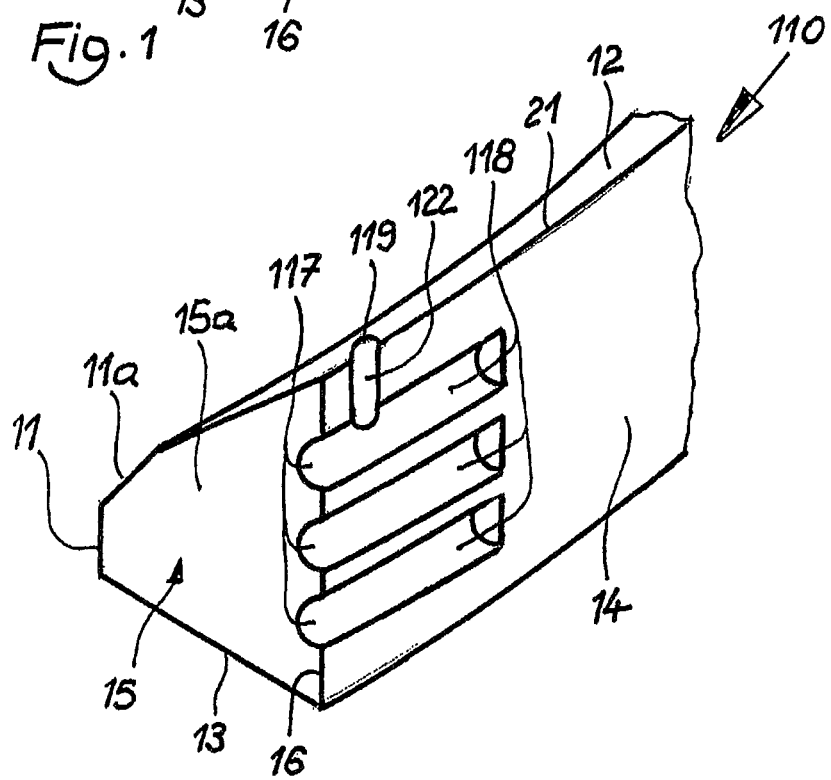
Figure 3:
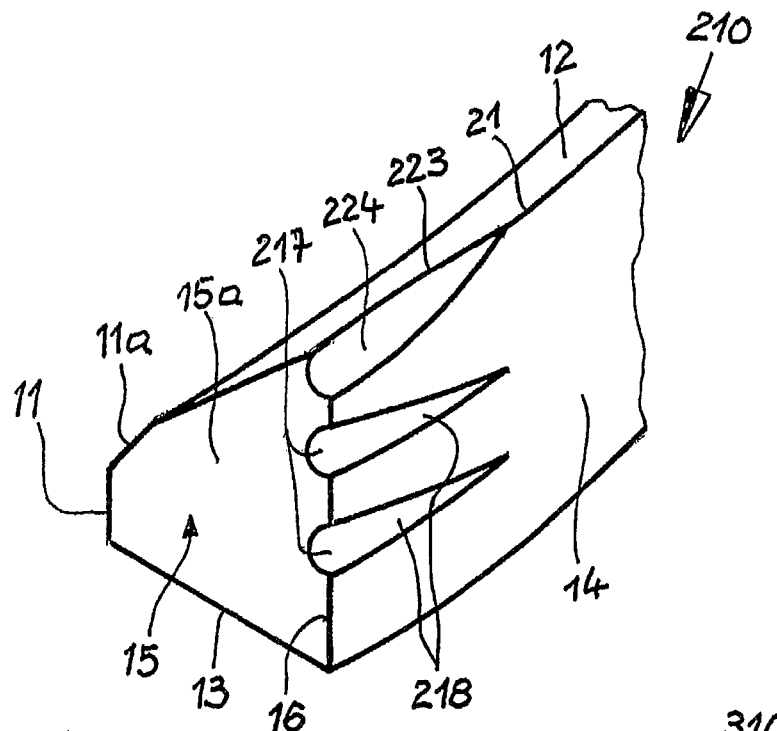
Figure 4:
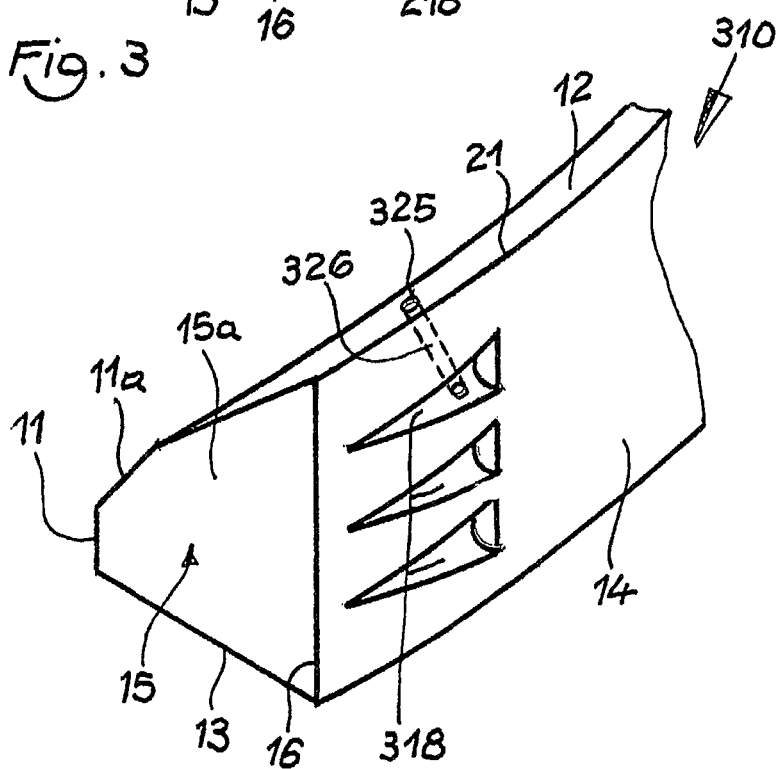

Exemplary embodiments of the invention will be explained in greater detail below, using the attached drawings. These show, in a schematic representation, not true to scale:

FIG. 1 a perspective detail view of a first exemplary embodiment of a piston ring according to the invention, in the region of a ring joint end;

FIG. 2 a perspective detail view of a further exemplary embodiment of a piston ring according to the invention, in the region of a ring joint end;

FIG. 3 a perspective detail view of a further exemplary embodiment of a piston ring according to the invention, in the region of a ring joint end;

FIG. 4 a perspective detail view of a further exemplary embodiment of a piston ring according to the invention, in the region of a ring joint end;

FIG. 5 a perspective detail view of a further exemplary embodiment of a piston ring according to the invention, in the region of a ring joint end;

FIG. 6 a cross-section through the groove of a further exemplary embodiment of a piston ring according to the invention, after coating and finish-machining of the ring face;

FIG. 7 a representation according to FIG. 6 of a further exemplary embodiment of a piston ring according to the invention.

FIG. 1 shows a first exemplary embodiment of a piston ring 10 according to the invention. The piston ring 10, in known manner, has a ring back 11 provided with a bevel 11a, an upper ring side 12, a lower ring side 13, and a ring face 14. The ring face 14 borders on the upper ring side 12 by way of an edge 21. The piston ring 10 furthermore has two free ring joint ends that delimit a gap or ring joint, in known manner. A ring joint end 15 with its face surface 15a is shown in FIG. 1. The face surface 15a borders on the ring face 14 by way of an edge 16. For reasons of simplicity, no representation is provided of coating of the ring face 13 with a coating agent, particularly with a slide layer.

According to the invention, the piston ring 10 has at least one opening that forms a fluid connection between the ring face 14 and the ring back 11. In a finished, assembled piston/cylinder arrangement of an internal combustion engine, the at least one opening produces a fluid connection between the cylinder volume and the ring groove of the piston, in which the piston ring 10 according to the invention is accommodated.

In the exemplary embodiment according to FIG. 1, three openings 17 are provided. In this exemplary embodiment, the openings 17 are configured as recesses in the edge 16 that connects the face surface 15a of the ring joint end 15 and the ring face 14 with one another.

The openings 17 can be produced by means of simple material removal in the region of the edge 16. In the present exemplary embodiment, three grooves 18 that run parallel to one another and in the circumference direction are introduced into the ring face 14, which grooves open into the face surface 15a of the ring joint end 15, which brings about the configuration of the openings 17. Of course, any desired number of grooves can be introduced into the ring face 14, and two or more grooves also do not necessarily have to run parallel to one another.

The dimensions of the grooves 18 depend on the dimensions of the piston ring 10 and on the demands on the piston ring 10 during engine operation, and are at the discretion of a person skilled in the art. In the exemplary embodiment according to FIG. 1, each groove 18 has a constantly decreasing depth and a constantly decreasing width, proceeding from the region of the ring joint end 15. Of course, the grooves 18 can also have a constant depth and/or width, a constantly increasing depth and/or width, proceeding from the region of the ring joint end 15, as well as any desired combination of these characteristics. The length of the grooves 18 generally amounts to two times to ten times the axial height of the ring face 14. The depth of the grooves 18 generally amounts to 10 μm to 50 μm. The width of the grooves 18 generally amounts to 10% to 60% of the axial height of the ring face 14.

FIG. 2 shows a further exemplary embodiment of a piston ring 110 according to the invention. The piston ring 110 essentially corresponds to the piston ring 10 according to FIG. 1, so that the same structural elements are provided with the same reference symbols, and reference is made, in this regard, to the description of FIG. 1.

According to the invention, the piston ring 110 has at least one opening that forms a fluid connection between the ring face 14 and the ring back 11. In a finished, assembled piston/cylinder arrangement of an internal combustion engine, the at least one opening produces a fluid connection between the cylinder volume and the ring groove of the piston, in which the piston ring 110 according to the invention is accommodated.

In the exemplary embodiment according to FIG. 2, three openings 117 as well as one opening 119 are provided. In this exemplary embodiment, the openings 117 are configured as recesses in the edge 16 that connects the face surface 15a of the ring joint end 15 and the ring face 14 with one another.

The openings 117 can be produced by means of simple material removal in the region of the edge 16. In the present exemplary embodiment, three grooves 118 that run parallel to one another and in the circumference direction are introduced into the ring face 14, which grooves open into the face surface 15a of the ring joint end 15, which brings about the configuration of the openings 117.

In this exemplary embodiment, the opening 119 is configured as a recess in the edge 21 that connects the ring face 14 with the upper ring side 12 of the piston ring 110. The opening 119 can be produced by means of simple material removal in the region of the edge 21. In the present exemplary embodiment, a further recess 122, which runs axially, is introduced into the ring face 14, which opens, on the one hand, into a groove 118, and, on the other hand, into the upper ring side 12 of the piston ring 110 according to the invention, which brings about the configuration of the opening 119. Of course, the recess 122 does not necessarily have to open into a groove 118. Furthermore, a piston ring that exclusively has such a recess or that has grooves that run parallel, in addition to such a recess, which grooves are disposed at a distance from the ring joint end 15, also belongs to the present invention.

The dimensions of the grooves 118 depend on the dimensions of the piston ring 110 and on the demands on the piston ring 110 during engine operation, and are at the discretion of a person skilled in the art. In the exemplary embodiment according to FIG. 2, each groove 118 has a constant depth and a constant width, proceeding from the region of the ring joint end 15. The length of the grooves 118 generally amounts to two times to ten times the axial height of the ring face 14. The depth of the grooves 118 generally amounts to 10 μm to 50 μm. The width of the grooves 118 generally amounts to 10% to 60% of the axial height of the ring face 14.

FIG. 3 shows a further exemplary embodiment of a piston ring 210 according to the invention. The piston ring 210 essentially corresponds to the piston ring 10 according to FIG. 1, so that the same structural elements are provided with the same reference symbols, and reference is made, in this regard, to the description of FIG. 1.

According to the invention, the piston ring 210 has at least one opening that forms a fluid connection between the ring face 14 and the ring back 11. In a finished, assembled piston/cylinder arrangement of an internal combustion engine, the at least one opening produces a fluid connection between the cylinder volume and the ring groove of the piston, in which the piston ring 210 according to the invention is accommodated.

In the exemplary embodiment according to FIG. 3, two openings 217 as well as one opening 223 are provided. In this exemplary embodiment, the openings 217 are configured as recesses in the edge 16 that connects the face surface 15a of the ring joint end 15 and the ring face 14 with one another. The openings 217 can be produced by means of simple material removal in the region of the edge 16. In the present exemplary embodiment, two grooves 218 that run parallel to one another and in the circumference direction are introduced into the ring face 14, which grooves open into the face surface 15a of the ring joint end 15, which brings about the configuration of the openings 217.

In this exemplary embodiment, the opening 223 is configured as a recess in the edge 21 that connects the ring face 14 with the upper ring side 12 of the piston ring 210. The opening 223 can be produced by means of simple material removal in the region of the edge 21. In the present exemplary embodiment, a further groove 224, which runs in the circumference direction, is introduced into the ring face 14, which opens into the upper ring side 12 of the piston ring 210 according to the invention, which brings about the configuration of the opening 223. Furthermore, a piston ring that exclusively has a groove that opens into the edge 21 or that has grooves that run parallel, in addition to the groove that opens into the edge 21, which grooves are disposed at a distance from the ring joint end 15, also belongs to the present invention.

The dimensions of the grooves 218, 224 depend on the dimensions of the piston ring 210 and on the demands on the piston ring 210 during engine operation, and are at the discretion of a person skilled in the art. In the exemplary embodiment according to FIG. 3, the grooves 218 have a constantly decreasing depth and a constantly decreasing width, proceeding from the region of the ring joint end 15. The length of the grooves 218, 224 generally amounts to two times to ten times the axial height of the ring face 14. The depth of the grooves 218, 224 generally amounts to 10 μm to 50 μm. The width of the grooves 218, 224 generally amounts to 10% to 60% of the axial height of the ring face 14.

FIG. 4 shows a further exemplary embodiment of a piston ring 310 according to the invention. The piston ring 310 essentially corresponds to the piston ring 10 according to FIG. 1, so that the same structural elements are provided with the same reference symbols, and reference is made, in this regard, to the description of FIG. 1.

According to the invention, the piston ring 310 has at least one opening that forms a fluid connection between the ring face 14 and the ring back 11. In a finished, assembled piston/cylinder arrangement of an internal combustion engine, the at least one opening produces a fluid connection between the cylinder volume and the ring groove of the piston, in which the piston ring 310 according to the invention is accommodated.

In the exemplary embodiment according to FIG. 4, precisely one opening 325 is provided. In this exemplary embodiment, the opening 325 is configured in the upper ring side 12. Of course, the opening 325 can also be configured in the ring back 11. The opening 325 is configured as a part of a bore 326, which connects the upper ring side 12 with the ring face 14 of the piston ring 310 according to the invention.

In the present exemplary embodiment, three grooves 318 that run parallel to one another and in the circumference direction are furthermore introduced into the ring face 14, which grooves are disposed at a distance from the face surface 15a or the ring joint end 15. In the present exemplary embodiment, the bore 326 opens into one of the grooves 318. However, this is not compulsory, because the bore 326 can open into the ring face 14 at any point, which can be selected as desired. Furthermore, a piston ring that exclusively has one bore 326 or that has grooves that run parallel, in addition to the bore 326, which grooves open into the face surface of the ring joint end 15, also belongs to the present invention.

The dimensions of the grooves 318 depend on the dimensions of the piston ring 310 and on the demands on the piston ring 310 during engine operation, and are at the discretion of a person skilled in the art. In the exemplary embodiment according to FIG. 4, the grooves 318 have a constantly increasing depth and a constantly increasing width, proceeding from the region of the ring joint end 15. The length of the grooves 318 generally amounts to two times to ten times the axial height of the ring face 14. The depth of the grooves 318 generally amounts to 10 μm to 50 μm. The width of the grooves 318 generally amounts to 10% to 60% of the axial height of the ring face 14.

FIG. 5 shows a further exemplary embodiment of a piston ring 410 according to the invention. The piston ring 410 essentially corresponds to the piston ring 10 according to FIG. 1, so that the same structural elements are provided with the same reference symbols, and reference is made, in this regard, to the description of FIG. 1.

According to the invention, the piston ring 410 has at least one opening that forms a fluid connection between the ring face 14 and the ring back 11. In a finished, assembled piston/cylinder arrangement of an internal combustion engine, the at least one opening produces a fluid connection between the cylinder volume and the ring groove of the piston, in which the piston ring 410 according to the invention is accommodated.

In the exemplary embodiment according to FIG. 5, precisely one opening 427 is provided. In this exemplary embodiment, the opening 427 is configured in the face surface 15a of the ring joint end 15. The opening 427 is configured as a fillet 428 that runs radially along the face surface 15a of a ring joint end, from the ring face 14 to the ring back 11, which fillet connects the ring back 11 with the ring face 14 of the piston ring 410 according to the invention.

In the present exemplary embodiment, three grooves 418 that run parallel to one another and in the circumference direction are furthermore introduced into the ring face 14, which grooves are disposed at a distance from the face surface 15a or the ring joint end 15. Furthermore, a piston ring in which the fillet 428 opens into one of the grooves 418 or that has grooves that run parallel and open into the face surface of the ring joint end 15 also belongs to the present invention.

The dimensions of the grooves 418 depend on the dimensions of the piston ring 410 and on the demands on the piston ring 410 during engine operation, and are at the discretion of a person skilled in the art. In the exemplary embodiment according to FIG. 5, the grooves 418 have a constant depth and a constant width, proceeding from the region of the ring joint end 15. The length of the grooves 418 generally amounts to two times to ten times the axial height of the ring face 14. The depth of the grooves 418 generally amounts to 10 μm to 50 μm. The width of the grooves 418 generally amounts to 10% to 60% of the axial height of the ring face 14.

FIGS. 6 and 7 show two further exemplary embodiments of a piston ring 510, 610, in which the ring face 14 is coated with a coating agent 526, 629, and in which at least one groove 518, 618 is introduced into the ring face 14. The groove 518, 618 that is shown, in each instance, is partially filled with the coating agent 529, 629. The surface of the coating agent 529, 629 present in the groove 518, 618, in each instance, is set back relative to the surface of the coating agent 529, 629 applied to the surface of the ring face 14. The set-back 531, 631 can be configured, for example, in the shape of a spherical cap (see FIG. 6) or rectangle or trapezoid (see FIG. 7). The set-back 531, 631 ensures that during the combustion cycle, the combustion gases that act on the ring face 14 penetrate into the groove 518, 618, in each instance, and exert the desired pressure on the piston ring 510 or 610 according to the invention, which pressure acts radially inward. In general, the coating is applied in a thickness of 5 μm to 30 μm, preferably 20 μm, for example by means of a PVD method.

The invention claimed is:

1. A piston ring for pistons of internal combustion engines, comprising a ring face, a ring back, an upper ring side, a lower ring side and two ring joint ends spaced apart by a gap, wherein the ring face has at least one groove only in the region of the ring joint ends, said at least one groove extending in a circumference direction, wherein every one of the at least one groove opens into a face surface of the ring joint end and forms a fluid connection between the ring face and ring back or ring side.

2. The piston ring according to claim 1, further comprising at least one fillet that runs radially along the face surface of the ring joint end from the ring face to the ring back and forms a fluid connection between the ring face and the ring back.

3. The piston ring according to claim 1, further comprising a bore that runs from the region of the ring back or one of the ring sides to the at least one groove and forms a fluid connection between the groove and the ring back or one of the ring sides.

4. The piston ring according to claim 1, wherein the at least one groove is filled at least partially with a coating agent.

5. The piston ring according to claim 4, wherein the ring face is coated with a coating agent, and a surface of the coating agent present in the filled groove is set back relative to the surface of the coating agent present on the surface of the ring.

6. The piston ring according to claim 1, wherein a length of the at least one groove amounts to two times to ten times an axial height of the ring face, a width of the at least one groove amounts to 10% to 60% of the axial height of the ring face and/or a depth of the at least one groove-amounts to 10 μm to 50 μm.

7. The piston ring according to claim 1, wherein the at least one groove has a constant depth or a constantly decreasing depth or a constantly increasing depth over its entire length, proceeding from a region of the ring joint end.

8. The piston ring according to claim 1, wherein the at least one groove has a constant width over its entire length.

9. The piston ring according to claim 1, wherein the at least one groove has a constantly decreasing or increasing width over its entire length, proceeding from a region of the ring joint end.

* * * * *